(12) United States Patent
Zhang et al.

(10) Patent No.: US 9,071,501 B2
(45) Date of Patent: Jun. 30, 2015

(54) METHOD FOR GROUP CHANGE ISSUES IN MTC

(75) Inventors: Xiaowei Zhang, Tokyo (JP); Anand Raghawa Prasad, Tokyo (JP)

(73) Assignee: NEC CORPORATION, Tokyo (JP)

( * ) Notice: Subject to any disclaimer, the term of this patent is extended or adjusted under 35 U.S.C. 154(b) by 182 days.

(21) Appl. No.: 13/809,229

(22) PCT Filed: Jun. 8, 2011

(86) PCT No.: PCT/JP2011/063749
§ 371 (c)(1),
(2), (4) Date: Jan. 9, 2013

(87) PCT Pub. No.: WO2012/023337
PCT Pub. Date: Feb. 23, 2012

(65) Prior Publication Data
US 2013/0138817 A1     May 30, 2013

(30) Foreign Application Priority Data

Aug. 17, 2010 (JP) ................................. 2010-182384

(51) Int. Cl.
| | | |
|---|---|---|
| G06F 15/173 | (2006.01) | |
| H04L 12/24 | (2006.01) | |
| H04L 29/06 | (2006.01) | |
| H04W 4/00 | (2009.01) | |
| H04L 29/08 | (2006.01) | |
| H04W 4/08 | (2009.01) | |
| H04M 7/00 | (2006.01) | |

(52) U.S. Cl.
CPC .............. *H04L 41/00* (2013.01); *H04L 63/104* (2013.01); *H04L 63/20* (2013.01); *H04M 7/0075* (2013.01); *H04W 4/005* (2013.01); *H04L 67/12* (2013.01); *H04W 4/08* (2013.01)

(58) Field of Classification Search
CPC . H04L 12/66; H04L 65/102; H04L 29/08144; H04L 47/125; H04L 67/1002; H04L 9/00; H04L 2012/5678; H04L 4/08; H04L 41/00; H04L 63/20; H04L 63/104; H04L 67/12; H04W 28/08
See application file for complete search history.

(56) References Cited

U.S. PATENT DOCUMENTS

| | | | |
|---|---|---|---|
| 7,650,402 B1 * | 1/2010 | Batz et al. ..................... | 709/224 |
| 7,738,452 B1 * | 6/2010 | O'Rourke et al. ............ | 370/389 |
| 8,369,876 B2 | 2/2013 | Bachmann et al. | |

(Continued)

FOREIGN PATENT DOCUMENTS

| | | |
|---|---|---|
| CN | 101523816 | 9/2009 |
| CN | 101523951 | 9/2009 |

(Continued)

OTHER PUBLICATIONS

Korean Official Action dated Nov. 21, 2013; Application No. 10-2013-7001329.

(Continued)

*Primary Examiner* — Krisna Lim
(74) *Attorney, Agent, or Firm* — Young & Thompson

(57) ABSTRACT

A gateway (GW) is optimized for security management, when a group member of MTC device changes group. The gateway performs access control to determine if MTC device can move to the target group. When the change is successfully completed, the gateway allocates group key of the target group to MTC devices.

18 Claims, 5 Drawing Sheets

(56) References Cited

U.S. PATENT DOCUMENTS

| | | |
|---|---|---|
| 8,374,150 B2 | 2/2013 | Kitazoe |
| 8,909,227 B2 | 12/2014 | Kitazoe et al. |
| 8,971,270 B2 | 3/2015 | Bachmann et al. |
| 2002/0147810 A1* | 10/2002 | Traversat et al. ............ 709/224 |
| 2003/0235309 A1* | 12/2003 | Struik et al. ................. 380/278 |
| 2004/0162871 A1* | 8/2004 | Pabla et al. .................. 709/201 |
| 2005/0025179 A1* | 2/2005 | McLaggan et al. ........... 370/468 |
| 2008/0062948 A1 | 3/2008 | Ponnuswamy |
| 2008/0281954 A1 | 11/2008 | Bagal |
| 2009/0149184 A1 | 6/2009 | Hohne et al. |
| 2010/0035633 A1 | 2/2010 | Park et al. |
| 2011/0103407 A1* | 5/2011 | Varier et al. ................. 370/503 |
| 2013/0021970 A1 | 1/2013 | Lei |
| 2013/0136072 A1* | 5/2013 | Bachmann et al. ........... 370/329 |

FOREIGN PATENT DOCUMENTS

| | | |
|---|---|---|
| JP | 2009-538583 | 11/2009 |
| JP | 2013-516857 | 5/2013 |
| JP | 2013-524563 | 6/2013 |
| KR | 2010-0019300 A | 2/2010 |
| WO | WO 2006/020834 | 2/2006 |
| WO | 2009/106265 | 9/2009 |

OTHER PUBLICATIONS

Japanese Official Action—2013-505015—Feb. 4, 2014.
International Search Report, PCT/JP2011/063749, Sep. 8, 2011.
3GPP TS 23.888, "System Improvements for Machine-Type Communications (Release 10)", V0.5.1, Jul. 2010, section 5.1, pp. 8-9.
Chinese Office Action, dated Sep. 28, 2014, in corresponding Chinese Patent Application No. 201180037532.7.
Japanese Official Action—2014-091280—Feb. 17, 2015.
3GPP TS 22.368—3rdGeneration Partnership Project; Technical Specification Group Services and System Aspects; Service requirements for Machine-Type Communications (MTC); Stage 1 (Release 10), pp. 1-25, V10.1.0, Jun. 16, 2010.

* cited by examiner

METHOD FOR GROUP CHANGE ISSUES IN MTC

TECHNICAL FIELD

This invention provides a strategy for Machine-Type Communication (MTC) device changing group initiated by itself and network, and related security issues.

BACKGROUND ART

MTC devices are able to be grouped together communicating to the network (see Non Patent Literature (NPL) 1). It should be possible for a MTC device change to another group under the same gateway, due to subscription change, service requirements change or physical area change etc. It is not covered in 3rd Generation Partnership Project (3GPP) standards yet that how it should be realized.

When group change is under the same gateway, the procedure should not have network involved, but should have it updated.

CITATION LIST

Non Patent Literature

NPL 1: 3GPP TS 23.888, "System Improvements for Machine-Type Communications (Release 10)", V0.5.1, 2010-07, section 5.1, pp. 8-9

SUMMARY OF INVENTION

There are four main practical situations considered. First one is the MTC device sends request to change a group under the same gateway upon a user's request. This will be presented in Case I.

The second one is gateway allocates another group under it for MTC device and indicates MTC decide to change. This will be presented in Case II.

The third one and the forth one are when target group is under a different gateway. These will be presented in Case III and Case IV separately.

Note 1: a gateway can either be integrated in a MTC device or a separate device.

Advantageous Effects of Invention

Having core network not involved in the group change procedure can reduce signaling between it and MTC device and provides efficiency.

Using a gateway for the security management in group change procedure, it prevents further attacks to network.

It provides flexibility for MTC device to join a group when for example the subscription for the MTC device is changed.

DESCRIPTION OF EMBODIMENTS

Case I:

The object of the invention is achieved by optimizing a gateway (GW) for security management when a group member of MTC device sends request to change its group. Gateway is capable to perform access control to determine if MTC device can move to the target group. When the change is successfully completed, gateway allocates group key of the target group to MTC devices.

A few assumptions are made as below:

1. GW and the core network (CN) have established secure communication;
2. MTC device has established secure communication with GW and core network;
3. GW is associated with more than one group; and
4. Gateway should store all the group IDs for the groups it supports.

Figure 1:
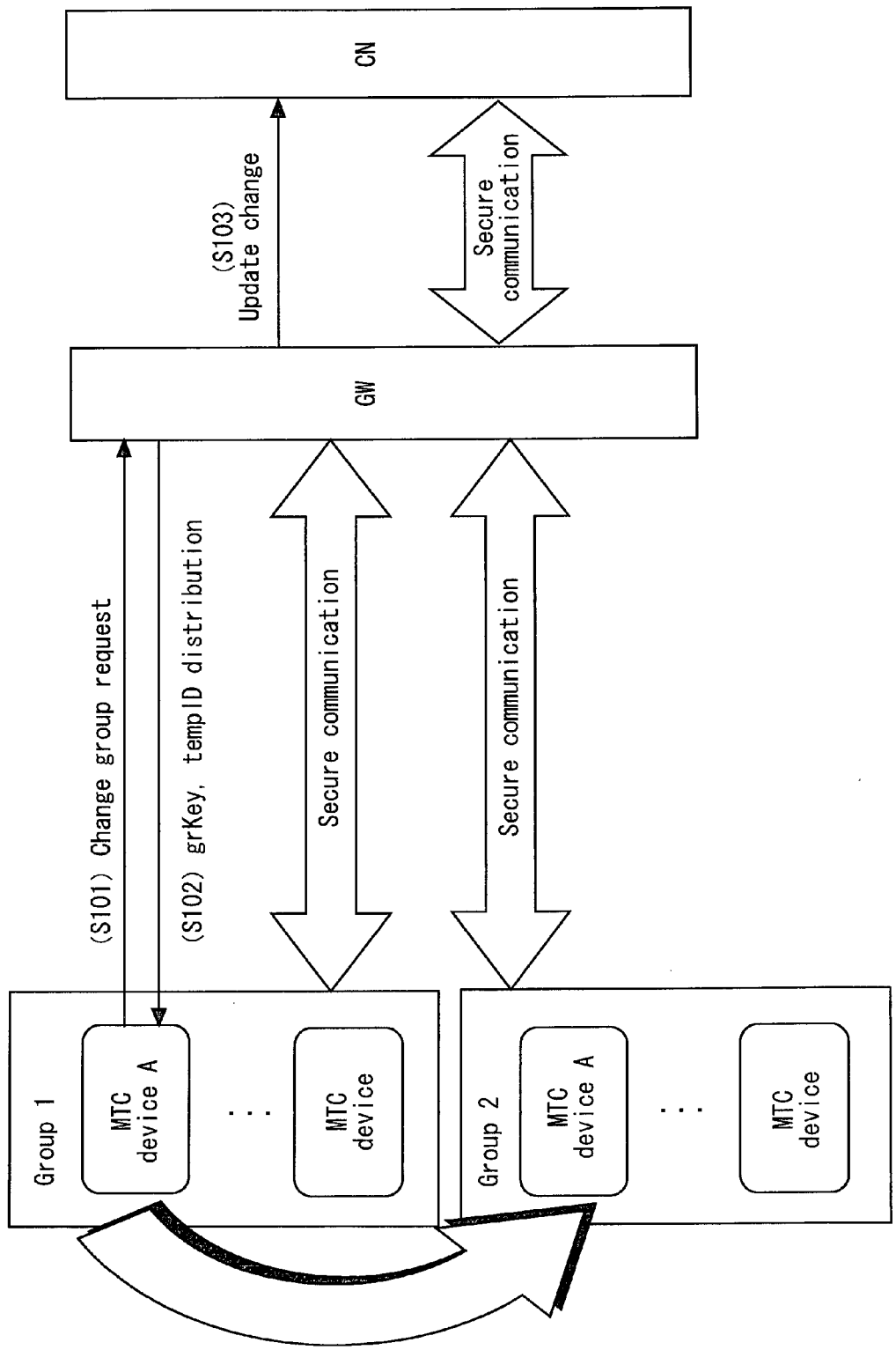
FIG. 1 is a block diagram showing operation in Case I.

The invention consists of the steps below:

1. MTC device sends a Group change request with its features and current group ID (Step S101 shown in FIG. 1). Note that as defined by 3GPP, the features (MTC Features) are network functions to optimize the network for use by M2M (Machine-to-Machine) applications. Specifically, the MTC device includes one or more of the following MTC features.

Low Mobility (which is intended for use with MTC devices that do not move, move infrequently, or move only within a certain region)

Time Controlled (which is intended for use with MTC devices that can tolerate to send or receive data only during defined time intervals and avoid unnecessary signalling outside these defined time intervals)

Time Tolerant (which is intended for use with MTC devices that can delay their data transfer)

Packet Switched (PS) Only (which is intended for use with MTC devices that only require packet switched services)

Small Data Transmission (which is intended for use with MTC devices that send or receive small amounts of data)

Mobile Originated Only (which is intended for use with MTC devices that only utilize mobile originated communications)

Infrequent Mobile Terminated (which is intended for use with MTC devices that mainly utilize mobile originated communications)

MTC monitoring (which is intended for monitoring MTC device related events)

Priority Alarm (which is intended for use with MTC devices that issue a priority alarm in the event of e.g. theft, vandalism or other needs for immediate attention)

Secure Connection (which is intended for use with MTC devices that require a secure connection between the MTC device and MTC Server)

Location Specific Trigger (which is intended to trigger MTC devices that are known by the MTC Application to be in a particular area)

Network Provided Destination for Uplink Data (which is intended for use with MTC Applications that require all data from an MTC device to be directed to a network provided destination IP address)

Infrequent Transmission (which is intended for use with MTC devices that are expected to send or receive data infrequently (i.e. with long period between two data transmission))

Group Based MTC Features (which is a collection of MTC Features that are intended for use with MTC Groups)

Group Based Policing (which is intended for use with a MTC Group, for which the network operator wants to enforce a combined QoS policy)

Group Based Addressing (which is intended for use with a MTC Group, for which the network operator wants to optimize the message volume when many MTC devices need to receive the same message)

2. Gateway should compare the MTC device features with those that target group supports, to determine whether the group change is acceptable.

3. Gateway should create a new temp ID for the MTC device and allocate it together with key of target group (Step S102). The temp ID is allocated for identifying the MTC device within target group, so that it is possible to prevent a unique ID of the MTC device from being revealed. The key is allocated for securely conducting communication between members of target group and the gateway. Examples of the key include an encryption key for encrypting data transmitted between the MTC device and the gateway, and a decryption key for decrypting the received data.

4. After a successful group change, the result should be informed to core network.

5. Sensitive information related to the source group should not be disclosed/brought to the target group, for which the MTC device should remove its old temp ID, old group ID and key, update location etc.

6. Gateway and network should update associated data upon the result for that MTC device (Step S103). Specifically, the gateway sends the temp ID and target group ID to the core network, thereby notifying the core network that the MTC device moves to target group. Thus, data associated with the MTC device can be updated and synchronized in the core network.

Case II:

The object of the invention is achieved by a strategy that network requests a MTC device to move to the target group through GW, to reach its own service requirements. The assumptions in Case I apply in this case.

Figure 2:
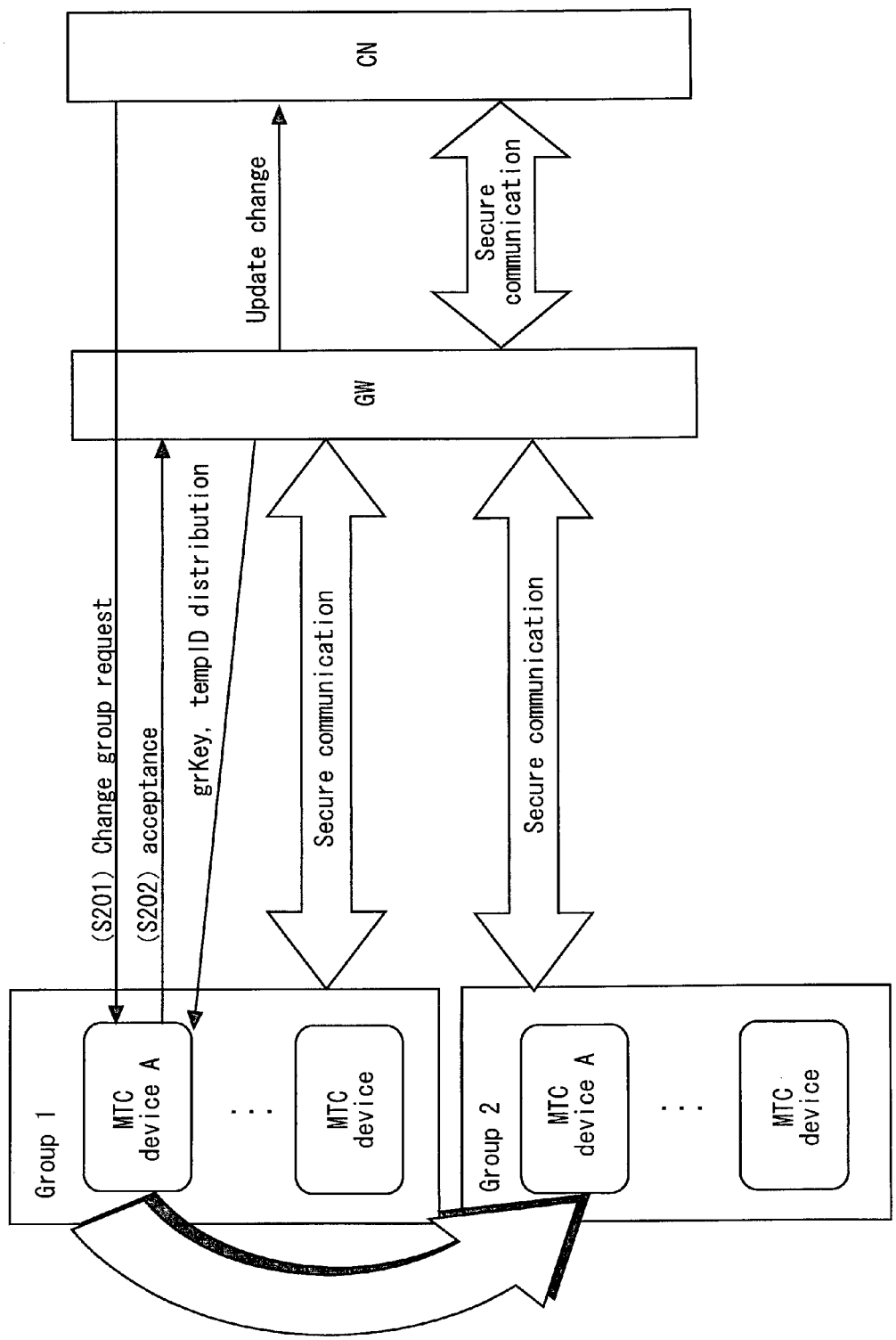
FIG. 2 is a block diagram showing operation in Case II.

The invention consists of the steps below:

1. Group change indication is sent from core network through GW to MTC device (Step S201 shown in FIG. 2). This indication includes target group ID, and features which are supported by target group (hereinafter, sometimes referred to as "target group features").

2. MTC device will send an acceptance message to gateway (Step S202), Step 2-5 in Case I applies here. Specifically, as with the gateway, MTC device compares its own features with the target group features. When MTC device can support the target group features, it sends the acceptance message which indicate that the group change is acceptable. The gateway, which has received the acceptance message, creates a new temp ID for the MTC device and allocates it together with key of target group.

3. If MTC device refuses to change, GW should be able to reject messages from it hereafter, re-send the request later again for a couple of times.

4. If MTC device rejected all requests, GW should be able to detach MTC device and remove subscription data of that MTC device.

Case III:

The object of the invention is achieved by a strategy that network controls a MTC device to move to the target group in a different GW. The assumptions in Case I apply in this case.

Figure 3:
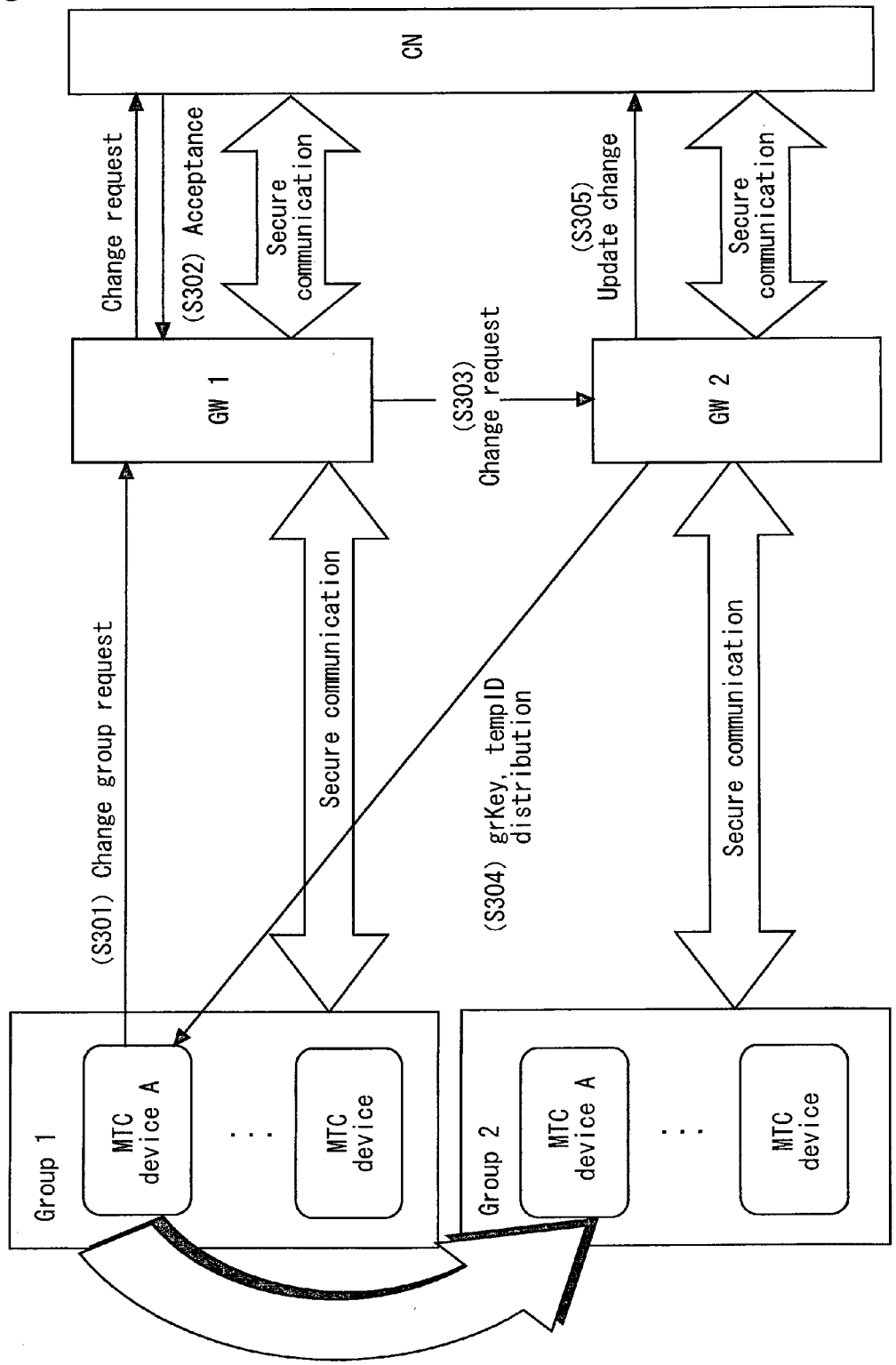
FIG. 3 is a block diagram showing operation in Case III.

The invention consists of the steps below:

1. Group change request is sent from MTC device to core network through source GW (Step S301 shown in FIG. 3).

2. Network will determine if group change is allowed by comparing features of MTC device and target group.

3. If the features match, network will send accept message to source gateway (Step S302).

4. Source gateway send group change request to target gateway, including security key and MTC device current temp ID (Step S303).

5. Target gateway will perform access control and send accept message to MTC device in case of a successful access control.

6. When target gateway receives acknowledgement from MTC device, it will generate new key and temp ID for MTC device and allocate them (Step S304).

7. Meanwhile, target gateway will inform network about the group change. Target gateway and network should update associated data upon the result for that MTC device (Step S305).

Case IV:

The object of the invention is achieved by a strategy that network controls a MTC device to move to the target group in a different GW. The assumptions in Case I apply in this case.

Figure 4:
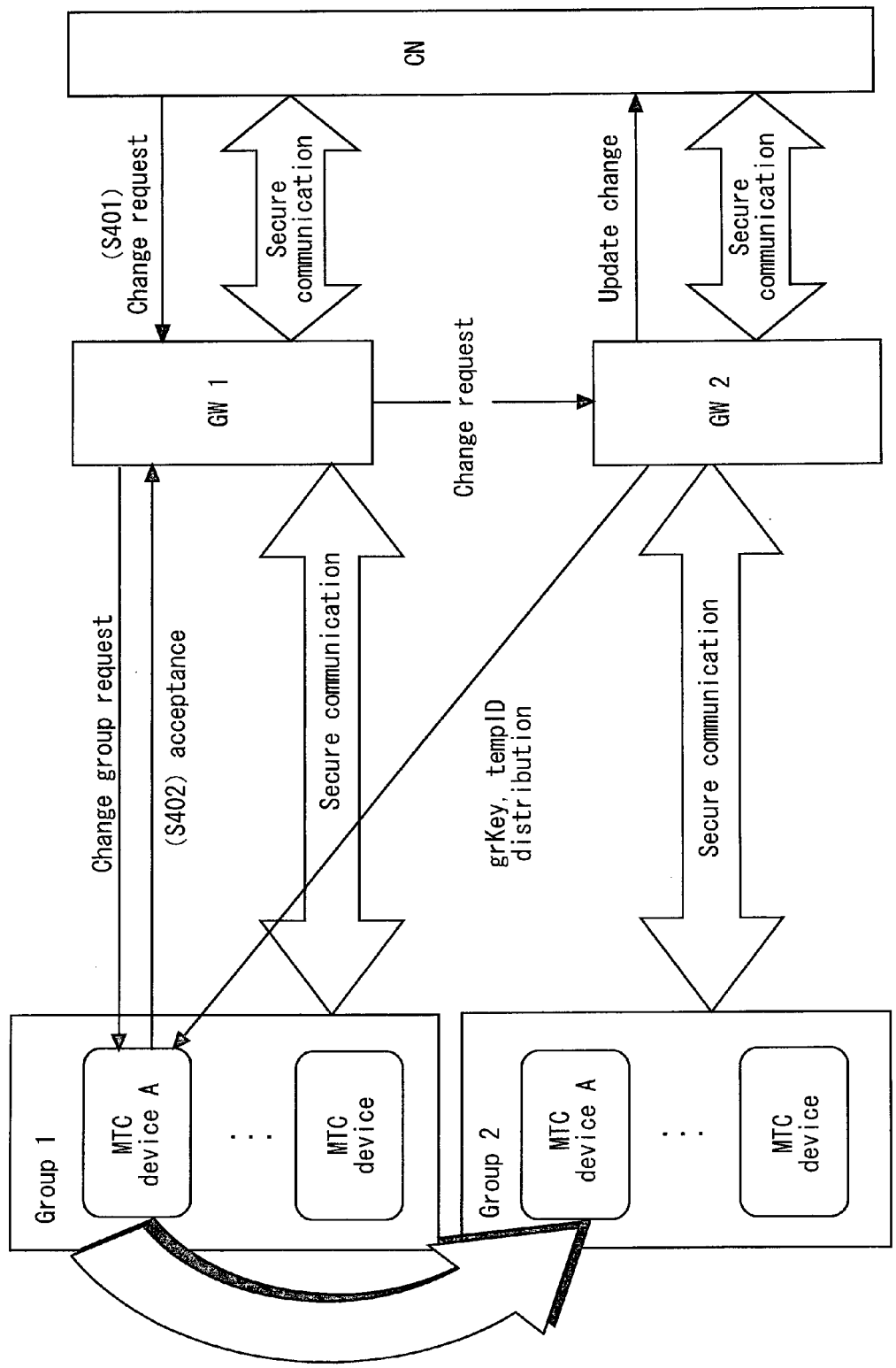
FIG. 4 is a block diagram showing operation in Case IV.

The invention consists of the steps below:

1. Group change indication is sent from core network through GW to MTC device (Step S401 shown in FIG. 4).

2. MTC device response to its source gateway (Step S402).

3. If target gateway receives a positive response, Step 3-7 in Case III apply here.

4. If target gateway receives a negative response, Step 3, 4 in Case II apply here.

Next, configuration example of the gateway will be described with reference to FIG. 5.

Figure 5:
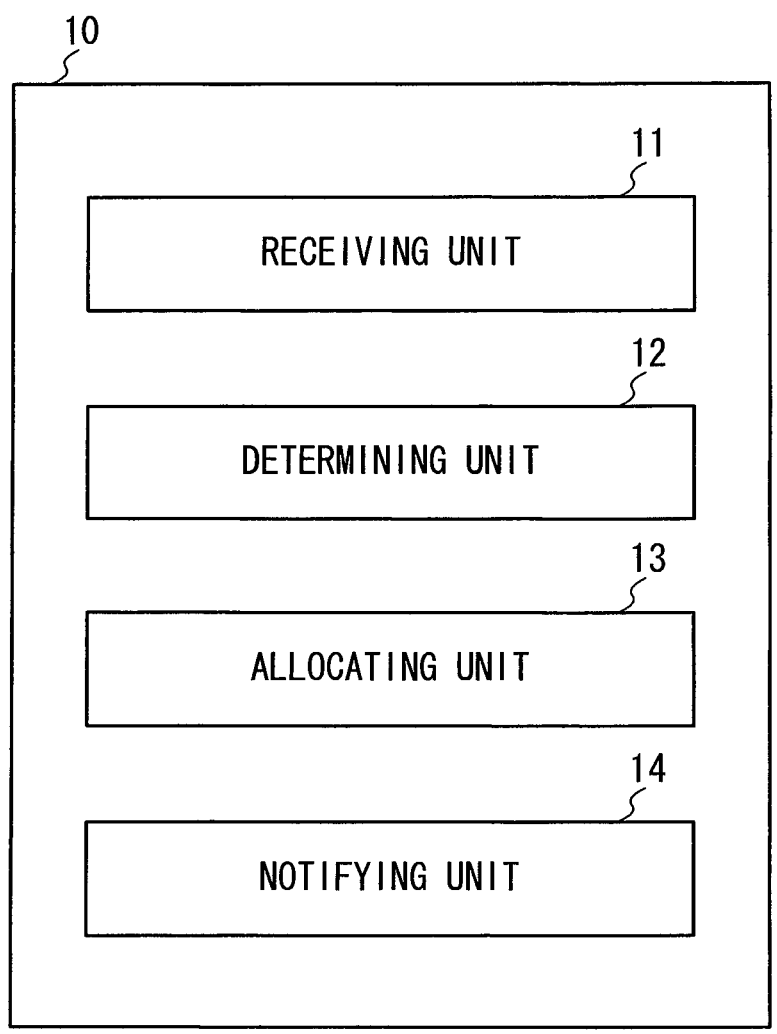
FIG. 5 is a block diagram showing a configuration example of a gateway common to Cases I to IV.

As shown in FIG. 5, a gateway 10 according to the above-mentioned exemplary embodiments includes a receiving unit 11, a determining unit 12, an allocating unit 13, and notifying unit 14. In Case I, the receiving unit 11 receives the Group change request from the MTC device. The determining unit 12 determines whether or not the Group change request is acceptable, by comparing the MTC features included in the Group change request with the target group features. When it is determined that the Group change request is acceptable, the allocating unit 13 allocates the key of target group to the MTC device. Further, the allocating unit 13 allocates the temp ID to the MTC device. Upon the allocation, the notifying unit 14 notifies the core network that the MTC device moves to the target group.

In Case II, the receiving unit 11 receives the Group change indication from the core network. At this time, the determining unit 12 transfers the Group change indication to the MTC device. When the acceptance message is received from the MTC device, the allocating unit 13 allocates the key of target group and the temp ID to the MTC device.

In Case III, the determining unit 12 transfers the Group change request from the MTC device to the core network, when the target group is under a different gateway. When the acceptance message is received from the core network, the allocating unit 13 requests the different gateway to allocate the key of target group and the temp ID to the MTC device.

In Case IV, the receiving unit 11 receives the Group change indication from the core network. At this time, the determining unit 12 transfers the Group change indication to the MTC device. When the acceptance message is received from the MTC device and the target group is under a different gateway, the allocating unit 13 requests the different gateway to allocate the key of target group and the temp ID to the MTC device.

The units 11 to 14 can be configured by, for example, transceivers which respectively conduct communication with the MTC device and the core network, and a controller which controls their transceivers to execute the processes respectively shown in FIGS. 1 to 4 or processes equivalent thereto.

Note that the present invention is not limited to the above-mentioned exemplary embodiments, and it is obvious that various modifications can be made by those of ordinary skill in the art based on the recitation of the claims.

This application is based upon and claims the benefit of priority from Japanese patent application No. 2010-182384, filed on Aug. 17, 2010, the disclosure of which is incorporated herein in its entirety by reference.

The whole or part of the exemplary embodiments disclosed above can be described as, but not limited to, the following supplementary notes.

(Supplementary Note 1)

Change Control:

GW will compare MTC device features received in Group request and target group supported features. This does not need core network to be involved in the change procedure.

(Supplementary Note 2)

Sensitive Data Management:

Sensitive data of source group in MTC device should not be brought to target group, and therefore are removed. In the same way, GW removes the data related with MTC device and source group.

(Supplementary Note 3)

Identifier and Key Handling

GW allocates a new temporary ID related with target group and sends the target group key to MTC device.

(Supplementary Note 4)

Update MTC Device Status in GW and Core Network

GW updates MTC device associated data and sends the group change result to network after the local change is successfully completed, so that MTC device associated data can be synchronized in network.

REFERENCE SIGNS LIST

10 GW
11 RECEIVING UNIT
12 DETERMINING UNIT
13 ALLOCATING UNIT
14 NOTIFYING UNIT

The invention claimed is:

1. A gateway being capable of relaying traffic between a plurality of communication devices and a network, the communication devices being grouped into at least two groups for communicating with the network, the gateway comprising:
   a first unit that receives from one communication device a request to change a group to which said one communication device belongs from one group to another group, the request including features of said one communication device;
   a second unit that determines whether or not the request is acceptable, by comparing the features with features to be supported by said another group; and
   a third unit that allocates, when it is determined that the request is acceptable, to said one communication device a group key of said another group for securely communicating with the gateway.

2. The gateway according to claim 1, wherein the third unit further allocates to said one communication device a temporary identifier for identifying said one communication device within said another group.

3. The gateway according to claim 2, further comprising:
   a unit that notifies the network that said one communication device moves to said another group, upon the allocation.

4. The gateway according to claim 2, further comprising:
   a unit that receives the request from the network,
   wherein the second unit transfers, when the request is received from the network, the request to said one communication device,
      wherein the third unit performs the allocation, when the request is accepted by said one communication device.

5. The gateway according to claim 2,
   wherein the second unit transfer, when said another group is under a different gateway, the request to the network,
   wherein the third unit requests, when the request is accepted by the network, the different gateway to allocate to said one communication device a group key of said another group for securely communicating with the different gateway.

6. The gateway according to claim 1, further comprising:
   a unit that notifies the network that said one communication device moves to said another group, upon the allocation.

7. The gateway according to claim 6, further comprising:
   a unit that receives the request from the network,
   wherein the second unit transfers, when the request is received from the network, the request to said one communication device,
      wherein the third unit performs the allocation, when the request is accepted by said one communication device.

8. The gateway according to claim 1, further comprising:
   a unit that receives the request from the network,
   wherein the second unit transfers, when the request is received from the network, the request to said one communication device,
   wherein the third unit performs the allocation, when the request is accepted by said one communication device.

9. The gateway according to claim 1,
   wherein the second unit transfer, when said another group is under a different gateway, the request to the network,
   wherein the third unit requests, when the request is accepted by the network, the different gateway to allocate to said one communication device a group key of said another group for securely communicating with the different gateway.

10. The gateway according to claim 9, wherein the third unit further requests the different gateway to allocate to said one communication device a temporary identifier for identifying said one communication device within said another group.

11. The gateway according to claim 1, further comprising:
   a unit that receives the request from the network,
   wherein the second unit transfer, when the request is received from the network, the request to said one communication device,
   wherein the third unit requests, when said another group is under a different gateway and the request is accepted by said one communication device, the different gateway to allocate to said one communication device a group key of said another group for securely communicating with the different gateway.

12. A method of controlling a gateway that can relay traffic between a plurality of communication devices and a network, the communication devices being grouped into at least two groups for communicating with the network, the method comprising:

receiving from one communication device a request to change a group to which said one communication device belongs from one group to another group, the request including features of said one communication device;

determining whether or not the request is acceptable, by comparing the features with features to be supported by said another group; and allocating, when it is determined that the request is acceptable, to said one communication device a group key of said another group for securely communicating with the gateway.

13. The method according to claim 12, further comprising: allocating to said one communication device a temporary identifier for identifying said one communication device within said another group.

14. The method according to claim 12, further comprising: notifying the network that said one communication device moves to said another group, upon the allocation.

15. The method according to claim 12, further comprising: receiving the request from the network, wherein when the request is received from the network, the request is transferred to said one communication device, wherein the allocation is performed, when the request is accepted by said one communication device.

16. The method according to claim 12, wherein when said another group is under a different gateway, the request is transferred to the network, wherein when the request is accepted by the network, the different gateway is requested to allocate to said one communication device a group key of said another group for securely communicating with the different gateway.

17. The method according to claim 16, wherein the different gateway is further requested to allocate to said one communication device a temporary identifier for identifying said one communication device within said another group.

18. The method according to claim 12, further comprising: receiving the request from the network, wherein when the request is received from the network, the request is transferred to said one communication device, wherein when said another group is under a different gateway and the request is accepted by said one communication device, the different gateway is requested to allocate to said one communication device a group key of said another group for securely communicating with the different gateway.

\* \* \* \* \*